March 2, 1965     J. R. MILES     3,171,884
MAGNIFIER HAVING A RELATIVELY LARGE FIELD AND EYE RELIEF
Filed April 11, 1960
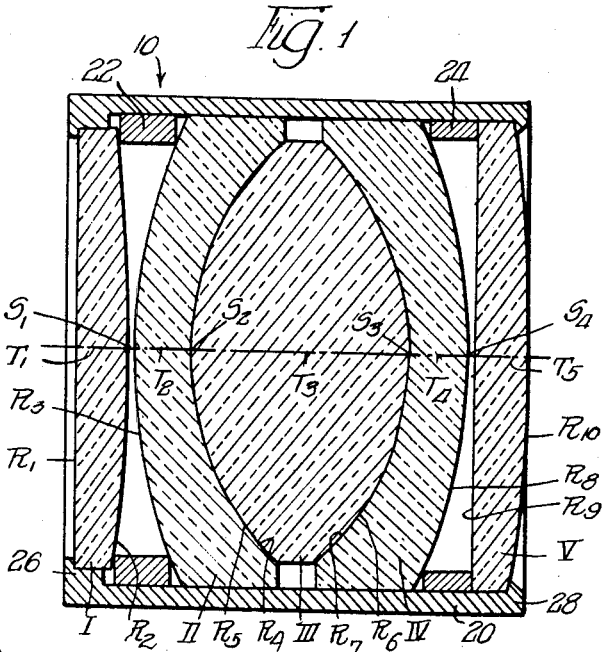
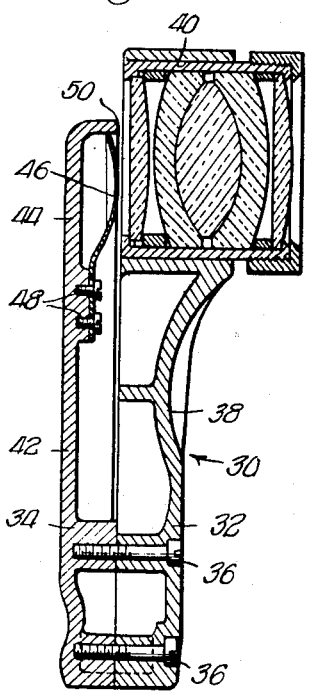
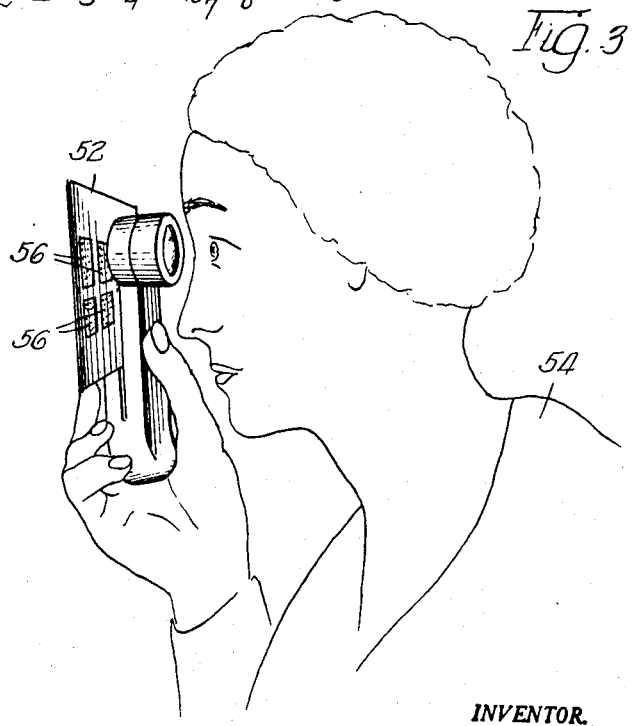
INVENTOR.
John R. Miles
BY Byron, Hume, Groen + Clement
attys

United States Patent Office 3,171,884
Patented Mar. 2, 1965

3,171,884
MAGNIFIER HAVING A RELATIVELY LARGE FIELD AND EYE RELIEF
John R. Miles, Glenview, Ill., assignor to Council on Library Resources, Inc., Washington, D.C., a corporation of the District of Columbia
Filed Apr. 11, 1960, Ser. No. 21,325
2 Claims. (Cl. 88—57)

This invention pertains to magnifiers and in particular to magnifiers adapted to be used in the reading of microcards and other similar minuscule reproductions of printed matter.

It has been the practice in the past few years to reproduce printed material by microphotographic techniques in order to reduce the storage space necessary to accommodate such printed matter. By way of example, the reproduced pages of books may be approximately one-half inch across the diagonal. As a result of the reduction in size, the type is so small that some magnifying means is necessary in order for it to be read. Magnifiers of various types have been used in the reading of such printed material which hereinafter for the purposes of convenience and by way of example will be referred to as microcards.

While various types of magnifiers have been available for many years, it has been found that most of them do not have a sufficient field of view for this use. Consequently numerous efforts have been made in recent years to produce magnifiers of the larger field of view but the eye relief has been relatively short. By eye relief it is meant the distance from the eye to the magnifier in question.

It has also been found that many of the magnifiers that are presently available produce an image of relatively low quality so that it is difficult for the reader to read the printed material. Generally the quality of the images suffers as the result of aberrations that are present in the lens used in constructing the magnifier.

For this reason I have found it necessary to invent a magnifier having the foremost feature and object of a relatively large field and eye relief and which is especially adapted to be used in the reading of microcards.

Another feature and object of the invention resides in the provision of a magnifier in which the aberrations are substantially corrected and considerably improved over magnifiers heretofore known.

Another feature and object of the invention resides in the provision of a magnifier that is of a new and novel construction and is economical in cost.

Another feature and object of the invention resides in the provision of a magnifier that is readily adapted to be mounted within a casing that is small enough to be held in the hand of the reader with a minimum of effort and may be carried in a pocket or purse when not in use.

These and other features and objects of the invention will be apparent upon reading of the specification with reference to the following drawing:

In the drawing—
FIGURE 1 illustrates in section the magnifier embodying the invention.
FIGURE 2 is a sectional view of the magnifier as mounted in one form of an apparatus adapted for reading microcards.
FIGURE 3 is a diagrammatic illustration of the magnifier and the apparatus in which it is mounted being used.

Referring now to FIGURE 1, there is shown a sectional view of a preferred form of the invention generally denoted by the numeral 10. The magnifier 10 includes a series of lens elements generally denoted by the numerals I, II, III, IV, and V, respectively. As shown in the drawing, the magnifier may be broadly described as including five lens elements in which the first lens element I is plano-convex, the second lens element II is convex-concave, the third lens element III is double convex, the fourth lens element IV is concave-convex, and the fifth and last lens element V is plano-convex. As shown in the drawing, all of the lens elements are optically aligned with the lens elements I and V being airspaced from the adjacent lens elements. Furthermore, the three center lens elements II–IV are grouped to form a triplet which is cemented together.

One preferred form of the invention is shown in the following table:

Table I

[EF=20.055]

| Lens | Radii | Thickness | Spaces | $n_d$ | $v$ |
|---|---|---|---|---|---|
| I | $R_1 = \infty$<br>$R_2 = -63.915$ | $T_1 = 2.13$ | $S_1 = .2$ | 1.620 | 60.0 |
| II | $R_3 = +22.207$<br>$R_4 = +11.103$ | $T_2 = 2.22$ | $S_2 = 0$ | 1.617 | 36.6 |
| III | $R_5 = +11.103$<br>$R_6 = -11.103$ | $T_3 = 8.88$ | $S_3 = 0$ | 1.517 | 64.5 |
| IV | $R_7 = -11.103$<br>$R_8 = -22.207$ | $T_4 = 2.22$ | $S_4 = .2$ | 1.617 | 36.6 |
| V | $R_9 = \infty$<br>$R_{10} = -58.843$ | $T_5 = 2.13$ |  | 1.620 | 60.0 |

The aforementioned table illustrates one preferred embodiment of the invention in which $n_d$ and $v$ represent the index of refraction in sodium $d$ light and the reciprocal dispersion ratio respectively and in which all other symbols are believed to be self-explanatory. While these data represent a preferred embodiment of the invention, it should be understood that they are merely by way of example and in no manner to be construed as limitations. As a matter of fact, it is possible to vary some or all of the constructional data of the lens elements and still obtain the desirable characteristics of the invention as long as technical adjustments are made in order to compensate for such variations.

Some suggested limits of variation for the radii of the lens elements are as follows: $R_1$ and $R_9$ can be varied between +500 and −500. $R_2$ can vary between 60 and 66. $R_3$ can vary between 21 and 23, $R_4$ and $R_5$ can vary between 10.5 and 11.6. $R_6$ and $R_7$, like $R_5$ and $R_4$, $R_8$ like $R_3$, and $R_{10}$ can vary between 50 and 60. The variations of the indices of refraction of the lens elements may be as high as .008 for the first and last elements and as high as .003 for the three center elements.

It is to be noted that both lens elements I and V may be reversed so that $R_2$ becomes $R_1$ and $R_9$ becomes $R_{10}$ without any substantial diminution of the quality of the image formed by the magnifier. It is to be further noted that the lens elements I and V each have substantially 20 percent of the power of the complete lens assembly. Actually the powers of the elements I and V are 19.4 and 21.1 percent of the power of the complete assembly, respectively. Lens element I may be further characterized as having a focal length of approximately 5.65 times the equivalent focal length of the magnifier and/or the convex surface thereof having a radius of between 3.0 and 3.25 times the equivalent focal length of the magnifier. Lens element V may be likewise characterized as having a focal length of approximately 4.75 times the equivalent focal length of the magnifier and/or the convex surface thereof having a radius of between 2.5 and 3.0 times the equivalent focal length.

By way of interest the triplet formed by the three center elements is somewhat similar to a prior art triplet which has been designated in some instances as the Hastings triplet. The Hastings triplet has been thought of as one of the better magnifiers. However, the Hastings triplet has rather poor aberration characteristics and furthermore, a rather short eye relief, as compared to the subject invention.

Referring back to FIGURE 1, it can be seen that the lens elements are mounted within the annular member 20 with the three center elements being positioned by means of the annular rings 22 and 24. The rings 22 and 24 also serve to position the first and last elements with respect to the second and fourth elements respectively, so as to maintain the desired space relationship. The first and last elements are held in abutment with the rings 22 and 24 respectively by means of the flanges 26 and 28 placed at the ends of the annular member 20.

The entire unit 10 as assembled in the annular member 20 may be inserted into a handle especially adapted for holding the articles to be read as shown in FIGURE 2 and generally denoted by the numeral 30. In this instance the handle 30 is especially adapted to be used in reading microcards. The handle 30 is constructed of two components 32 and 34 which are held together by means of the bolts 36. It is to be noted that the components 32 and 34 may be constructed of any one of various materials that have the desired physical characteristics for this application. It is apparent that one of the requirements of such a holder is that it be relatively light in weight and at the same time be strong enough to withstand ordinary abuse that occurs through normal use. One group of materials that are especially adapted for constructing the components 32 and 34 except where noted are plastic materials that may be readily molded to form the desired shapes shown in FIGURE 2 and which are light in weight and have a relatively high strength to weight ratio. The first component 32 is provided with a handle portion 38 at its lower end and an aperture 40 at its upper end. The aperture 40 is adapted to receive the annular member 20 in which the lens elements are mounted. The second portion 34 is provided with the handle portion 42 at its lower end and a means for detachably holding the matter to be read or viewed at its upper end 44. Such means may take the place of a leaf spring 46 which is secured to the handle component 34 by means of the bolts 48. At the upper end the components 32 and 34 are constructed so as to provide the space 50 in which the microcard 52 may be inserted. The microcard 52 is held in place by means of the spring 46 after one of the pages 56 reproduced thereon has been properly positioned with the lens assembly. As shown in FIGURE 3, the handle 30 is adapted to be held in the hand of the viewer and aligned with the viewer's eye so that the printed material may be seen. It has been found with the magnifier disclosed herein that substantially the entire page 56 of a book may be seen and read without having to reposition the card. As soon as the reader has finished a particular page 56, the card 52 may then be repositioned so that another page thereon is aligned with the magnifier so that it, too, may be read.

It is to be noted that not only is the magnifier sufficiently small to be held within the hand of the average person, but it may also be readily carried in a pocket or pocketbook without any undue inconvenience.

It is to be noted that the magnifier, when constructed according to the data set forth in Table I, has approximately 13 power. By magnifying power it is meant the result of dividing 10 inches by the focal length of the magnifier in inches. The 10 inches represents the distance at which an average person can view a particular object so as to thus give a comparison of the size that the viewer sees at 10 inches with the size seen through the magnifier. It is apparent that the subject invention may be applied to magnifiers of powers other than 13 and that such is not to be intended as a limitation.

It is contemplated that certain modifications may be made within the scope of the claims without departing from the spirit of the invention.

What is claimed is:

1. A magnifier having at least five lens elements in which the constructional data of the lens elements are as follows:

[EF=20.055]

| Lens | Radii | Thickness | Spaces | $n_d$ | $v$ |
|---|---|---|---|---|---|
| I | $R_1 = \infty$ | $T_1=2.13$ | | 1.620 | 60.0 |
| | $R_2 = -63.915$ | | $S_1=.2$ | | |
| II | $R_3 = +22.207$ | $T_2=2.22$ | | 1.617 | 36.6 |
| | $R_4 = +11.103$ | | $S_2=0$ | | |
| III | $R_5 = +11.103$ | $T_3=8.88$ | | 1.517 | 64.5 |
| | $R_6 = -11.103$ | | $S_3=0$ | | |
| IV | $R_7 = -11.103$ | $T_4=2.22$ | | 1.617 | 36.6 |
| | $R_8 = -22.207$ | | $S_4=.2$ | | |
| V | $R_9 = \infty$ | $T_5=2.13$ | | 1.620 | 60.0 |
| | $R_{10} = -58.843$ | | | | | where R, T and S are the radii, thickness and spaces, respectively, and $n_d$ and $v$ are the index of refraction in sodium D light, and the reciprocal dispersion ratio, respectively.

2. A magnifier comprising five lens elements in which the first lens element is plano-convex, the second element is convex-concave, the third is double convex, the fourth is concave-convex, and the fifth is plano-convex, said second, third and fourth elements comprising a triplet for correcting the aberrations in said first and fifth elements, in which the constructional data of said first and fifth lens elements are as follows:

| Lens | Radii | Thickness | $n_d$ | $v$ |
|---|---|---|---|---|
| I | $R_1 = \infty$ | $T_1=2.13$ | 1.620 | 60.0 |
| | $R_2 = -63.915$ | | | |
| V | $R_9 = \infty$ | $T_5=2.13$ | 1.620 | 62.0 |
| | $R_{10} = -58.843$ | | | | where R, T and S are the radii, thickness and spaces, respectively, and $n_d$ and $v$ are the index of refraction in sodium D light, and the reciprocal dispersion ratio, respectively.

References Cited by the Examiner

UNITED STATES PATENTS

| | | | |
|---|---|---|---|
| 435,271 | 8/90 | Abbe | 88—57 |
| 1,707,351 | 4/29 | Fishe | 88—39 |
| 1,759,529 | 5/30 | Von Hofe | 88—57 |
| 1,929,199 | 10/33 | Fishe | 88—39 |
| 2,719,457 | 10/55 | Tripp | 88—72 |
| 2,861,499 | 11/58 | Korner et al. | 88—39 |

JEWELL H. PEDERSEN, *Primary Examiner.*

EMIL G. ANDERSON, *Examiner.*